United States Patent [19]

O'Melia et al.

[11] Patent Number: 5,401,334
[45] Date of Patent: Mar. 28, 1995

[54] FLUOROPOLYMER ALUMINUM LAMINATE

[75] Inventors: Lawrence F. O'Melia, Easthampton; Anthony J. Lalikos, Springfield, both of Mass.

[73] Assignee: Titeflex Corporation, Springfield, Mass.

[21] Appl. No.: 57,213

[22] Filed: May 4, 1993

Related U.S. Application Data

[63] Continuation of Ser. No. 613,267, Nov. 14, 1990, abandoned.

[51] Int. Cl.⁶ .......................... B23B 31/00; B05D 1/00
[52] U.S. Cl. ..................................... 148/265; 156/325; 428/421; 428/422
[58] Field of Search ................. 148/265; 428/421, 422; 156/325

[56] References Cited

U.S. PATENT DOCUMENTS

| | | |
|---|---|---|
| 2,294,334 | 8/1942 | Filbert . |
| 2,392,378 | 1/1946 | Hanford . |
| 2,471,909 | 5/1949 | Spruance, Jr. . |
| 2,493,934 | 1/1950 | Waring . |
| 2,539,329 | 1/1951 | Sanders . |
| 2,563,431 | 8/1951 | Spruance, Jr. . |
| 2,678,291 | 5/1954 | Spruance, Jr. et al. . |
| 2,798,829 | 7/1957 | Newhard et al. . |
| 2,808,342 | 10/1957 | Nickerson . |
| 2,809,130 | 10/1957 | Rappaport . |
| 2,811,471 | 10/1957 | Homeyer, Jr. . |
| 2,843,513 | 7/1958 | Stricklen . |
| 2,844,496 | 7/1958 | Newell et al. . |
| 2,850,419 | 9/1958 | Melse et al. . |
| 2,851,385 | 9/1958 | Spruance, Jr. et al. . |
| 2,936,254 | 5/1960 | Newhard, Jr. et al. . |
| 2,961,341 | 11/1960 | Long . |
| 2,961,358 | 11/1960 | Heller . |
| 2,976,193 | 3/1961 | Pimbley . |
| 2,988,465 | 6/1961 | Newhard, Jr. et al. . |
| 3,009,842 | 11/1961 | Steinbrecher . |
| 3,025,185 | 3/1962 | Schmidt . |
| 3,130,085 | 4/1964 | Otto . |
| 3,130,086 | 4/1964 | Otto . |
| 3,136,680 | 6/1964 | Hochberg . |
| 3,329,536 | 7/1967 | Lodeesen et al. . |
| 3,364,080 | 1/1968 | Hall . |
| 3,371,076 | 2/1968 | Ragazzini et al. . |
| 3,380,858 | 4/1968 | Champaneria et al. . |
| 3,404,046 | 10/1968 | Russell et al. . |
| 3,405,014 | 10/1968 | Kuwabara et al. . |
| 3,421,972 | 1/1969 | Cromwell et al. . |
| 3,447,972 | 6/1969 | Wilde, Jr. et al. . |
| 3,528,954 | 9/1970 | Carlson . |
| 3,535,168 | 10/1970 | Thompson . |
| 3,542,605 | 11/1970 | Harvey ................................. 148/265 |
| 3,563,785 | 2/1971 | Oga et al. . |
| 3,567,521 | 3/1971 | Toy et al. . |
| 3,579,370 | 10/1971 | Punderson et al. . |
| 3,676,566 | 7/1972 | McBride . |
| 3,781,185 | 12/1973 | Takamatsu et al. . |
| 3,837,895 | 9/1974 | Pryor et al. . |
| 3,840,619 | 10/1974 | Aronoff et al. . |
| 3,847,881 | 11/1974 | Mueller et al. . |
| 3,876,435 | 4/1975 | Dollman . |
| 3,895,969 | 7/1975 | Miller . |
| 3,900,684 | 8/1975 | Edwards et al. . |
| 3,907,610 | 9/1975 | Yamagishi et al. . |
| 3,936,569 | 2/1976 | Miller et al. . |
| 3,947,525 | 3/1976 | Robertson et al. . |
| 3,967,018 | 6/1976 | Jansta et al. . |
| 3,981,945 | 9/1976 | Attwood et al. . |
| 3,995,091 | 11/1976 | Dhami . |
| 4,024,316 | 5/1977 | Loris . |

(List continued on next page.)

FOREIGN PATENT DOCUMENTS

| | | |
|---|---|---|
| 0159942 | 4/1985 | European Pat. Off. . |
| WO90/03267 | 4/1990 | European Pat. Off. . |
| 1.574.105 | 4/1968 | France . |

(List continued on next page.)

OTHER PUBLICATIONS

European Search Report—EP 91 30 9225, 25 Mar. 1992.

*Primary Examiner*—Sam Silverberg
*Attorney, Agent, or Firm*—Louis Bernat

[57] ABSTRACT

An aluminum fluoropolymer laminate and a method for making such a laminate which includes conversion coating the aluminum and bonding the fluoropolymer onto the conversion coated aluminum is described.

18 Claims, No Drawings

U.S. PATENT DOCUMENTS

| | | |
|---|---|---|
| 4,035,565 | 7/1977 | Apotheker et al. . |
| 4,070,341 | 1/1978 | Schulze . |
| 4,070,525 | 1/1978 | Vassiliou et al. . |
| 4,075,288 | 2/1978 | Graveron et al. . |
| 4,104,416 | 8/1978 | Parthasarathy et al. . |
| 4,107,356 | 8/1978 | Ukihashi et al. . |
| 4,118,537 | 10/1978 | Vary et al. . |
| 4,146,410 | 3/1979 | Reinhold . |
| 4,196,256 | 4/1980 | Eddy et al. . |
| 4,226,646 | 10/1980 | Vassiliou . |
| 4,226,896 | 10/1980 | Coburn et al. . |
| 4,230,758 | 10/1980 | Nagai et al. . |
| 4,237,177 | 12/1980 | Slama et al. . |
| 4,248,924 | 2/1981 | Okita . |
| 4,250,215 | 2/1981 | Mayer . |
| 4,252,859 | 2/1981 | Concannon et al. . |
| 4,264,650 | 4/1981 | Schulze et al. . |
| 4,313,996 | 2/1982 | Newman et al. . |
| 4,339,506 | 7/1982 | Martin, Jr. . |
| 4,505,971 | 3/1985 | Martin, Jr. . |
| 4,513,055 | 4/1985 | Leibowitz . |
| 4,600,651 | 7/1986 | Aufdermarsh et al. . |
| 4,605,695 | 8/1986 | Sakamaki et al. . |
| 4,628,003 | 12/1986 | Katz . |
| 4,656,083 | 4/1987 | Hoffman et al. . |
| 4,666,762 | 5/1987 | Yamamoto . |
| 4,689,254 | 8/1987 | Arndt et al. . |
| 4,725,504 | 2/1988 | Knudsen et al. . |
| 4,791,012 | 12/1988 | d'Agostino et al. . |
| 4,800,661 | 1/1989 | Yamamoto et al. . |
| 4,818,618 | 4/1989 | Okazaki et al. . |
| 4,826,731 | 5/1989 | Wagner et al. . |
| 4,833,022 | 5/1989 | Bridges et al. . |
| 4,895,752 | 1/1990 | McEwen . |
| 4,916,017 | 4/1990 | Nomi et al. . |

FOREIGN PATENT DOCUMENTS

| | | |
|---|---|---|
| 52/26556 | 7/1977 | Japan . |
| 62/273846 | 11/1987 | Japan . |
| 808115 | 6/1957 | United Kingdom . |

FLUOROPOLYMER ALUMINUM LAMINATE

This application is a continuation of application Ser. No. 07/613,267, filed Nov. 14, 1990, now abandoned.

This invention relates to aluminum bonded with fluoropolymer. More particularly this invention relates to bonding a conversion coated aluminum surface to a fluoropolymer structure such as a fluoropolymer film.

Fluoropolymers are well known to have superior thermal resistance, chemical resistance and electrical insulating properties. Moreover, they also are known to have superior low friction and "anti-stick" characteristics. Unfortunately the latter properties render it difficult to bond such fluoropolymers including fluoropolymer films to provide a protective layer for metal or to give enhanced mechanical and thermodynamic properties to a fluoropolymer structure.

Heretofore polymers have been applied to aluminum by cleaning the aluminum and thereafter coating it by exposing the aluminum to a polymeric dispersion as described in U.S. Pat. No. 2,811,471 to Homeyer, U.S. Pat. No. 3,563,785 to Kobe-shi et al. and U.S. Pat. No. 4,118,537 to Vary et al. Generally, using polymer dispersions, the thickness of the coatings deposited have been limited, have a thick metal substrate relative to the thickness of the coated metal substrate and have not provided polymer to aluminum bonds strong enough to readily admit the fluoropolymer/aluminum laminate to product fabrication and applications. U.S. Pat. No. 2,961,342 to Long describes products with similar disadvantages as that patent describes coating aluminum with polymeric dispersions and cobalt oxide.

Adhesives also have been suggested as a means to bond aluminum to polytetrafluoroethylene as described in U.S. Pat. No. 2,809,130 to Rappaport. Adhesives require careful cleaning and etching with potentially hazardous chemicals and pose serious handling and manufacturing problems.

U.S. Pat. No. 4,230,758 to Nagai et al. describes yet another method for bonding aluminum to a "fluorine resin" wherein the aluminum is etched and an aluminum oxide is formed on the surface of the aluminum which then is dispersion coated. This method is limited as other dispersion coating methods are limited, requires etching and results in handling problems as a result of multiple steps and etching.

Fluoropolymers bonded to aluminum will advantageously provide composite structures for fluid transfer products with a fluoropolymer inner layer bonded to an external aluminum jacket, or a fluid transfer product with an internal metal layer with an outer layer or external layer of fluoropolymer. Also, fluoropolymers bonded to aluminum may be used in printed circuit boards, electronic components such as capacitors, shielding for electronics, high temperature coaxial applications and corrosion resistant diaphragms and barriers.

An object of this invention is to provide a fluoropolymer/aluminum laminate.

Another object of this invention is to provide a method of bonding aluminum and a fluoropolymer structure to provide a laminate with increased bond strengths, which laminate is easily fabricated and allows great latitude for product design and poses no threat to the environment.

Yet another object of this invention is to provide a laminate of aluminum and fluoropolymer where the thickness of the fluoropolymer is greater than the aluminum.

Still further objects and advantages of the invention will be found by reference to the following description.

SUMMARY OF THE INVENTION

The invention provides an aluminum/fluoropolymer laminate and a method of bonding aluminum with a fluoropolymer to provide the laminate. According to the invention, the method of bonding aluminum with a preexisting fluoropolymer structure (as opposed to depositing a fluoropolymer onto a substrate with a dispersion of fluoropolymer) includes applying a chromate conversion coating to the aluminum to provide a conversion coated aluminum. Thereafter according to the invention, a preexisting fluoropolymer structure having a thickness is superposed on and contacted with the conversion coated aluminum to provide a superposed conversion coated fluoropolymer laminate. The aluminum and fluoropolymer structure are held together in intimate contact and are heated with pressure and temperature and for a time to effectively bond the fluoropolymer to the conversion coated aluminum such as to at least about 550° F. for at least about one minute to provide the aluminum fluoropolymer laminate.

In another important aspect of the invention, conversion coated aluminum metal having a thickness in the range of from about 0.5 to about 1,000 mils is bonded with a fluoropolymer structure generally having a thickness in the range of from about 0.5 to about 1,000 mils with the ratio of the thickness of fluoropolymer to conversion coated aluminum in the range of from about 0.01 to about 100 and preferably from about 0.05 to about 20. The fluoropolymer structure is bonded with the conversion coating on the surface of the aluminum. In this aspect of the invention, the fluoropolymer aluminum bond strength is in excess of about 6 pounds per inch of width and generally in the range of from about 7 pounds to about 23 pounds. In this aspect of the invention, the fluoropolymer is bonded onto the conversion coated aluminum according to the method of this invention and permits the bonding of thin sheets of aluminum onto a fluoropolymer substrate thicker than the aluminum. In this aspect of the invention the laminate may be made by holding the conversion coated aluminum and fluoropolymer in intimate contact with one another at a pressure of at least about 10 psi. Thereafter the laminate is heated at a temperature range of from about 550° F. to about 850° F. to bond the conversion coated aluminum and fluoropolymer. Heating ranges and fluoropolymer to aluminum bond strengths vary with the fluoropolymer used, but temperatures should not be so elevated to destroy the structure of the fluoropolymer film.

In yet another aspect of the invention, different fluoropolymers may be layered onto the surface of another fluoropolymer and bonded thereto by raising the temperature of the two or more layers of fluoropolymers in contact with each other above the melt or gel point of the most thermally stable fluoropolymer. Both sides of a sheet of aluminum also may be conversion coated according to the method of the invention which sides then are bonded to a fluoropolymer which bonding results in a fluoropolymer/conversion coated aluminum/fluoropolymer laminate.

DESCRIPTION OF THE PREFERRED EMBODIMENTS

As used herein "chromate conversion coating" means the coating which results from exposing an aluminum metal surface to a coating composition which includes water and hexavalent chromium wherein the chromium reacts with the aluminum and forms a film (conversion coating) containing complex chromium compounds.

As used herein "fluoropolymer" means polymers of tetrafluoroethylene such as polytetrafluoroethylene, fluoroethylene copolymer, alkoxy fluoroethylene copolymer and ethylene tetrafluoroethylene copolymer.

Polytetrafluoroethylene has an initial melting point of 342° C. (648° F.), is commercially available from DuPont as Teflon and has the following structure:

Fluoroethylene copolymer has a melting point of about 270° F.±20° C.(518° F.±36° F.), is commercially available from DuPont as Teflon FEP Fluorocarbon Resin and has the following structure:

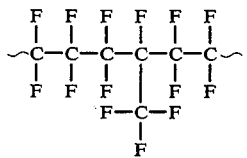

Alkoxy fluoroethylene copolymer has a melting point of about 300° C. (572° F.) minimum, is commercially available from DuPont as Teflon PFA Fluorocarbon Resin and has the following structure:

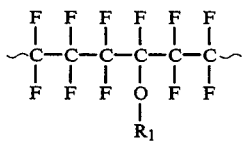

Ethylene tetrafluoroethylene copolymer has a melting point of about 255° C. (491° F.) minimum, is a copolymer of ethylene and tetrafluoroethylene, is commercially available from DuPont as "Tefzel" ETFE Fluoropolymer and has the following structure:

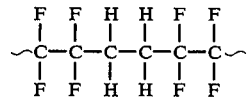

The above fluoropolymers have the following properties:

| TYPICAL PROPERTIES - FLUOROPOLYMERS | | | | |
|---|---|---|---|---|
| | Polytetra-fluoro-ethylene | Fluoro-ethylene Copolymer | Alkoxy Fluoro-ethylene Copolymer | Ethylene Tetra-fluoroethylene Copolymer |
| Tensile Strength, psi | 2500–4000 | 3000–4000 | 3500–4300 | 6000–7500 |
| Elongation, % | 200–400 | 300 | 275–300 | 100–300 |
| Tensile Modulus, psi, 73° F. | 80,000 | 50,000 | 40,000 | 120,000 |
| Flexural Modulus, psi | 50,000–90,000 | 95,000 | 95,000–100,000 | 170,000–200,000 |
| Hardness-Durometer | 50–65 | 55 | 60 | 75 |
| Coefficient of Friction Dynamic (<10 ft/min) | 0.1 | 0.2 | 0.2 | 0.4 |
| Flex Life (MIT) | >1,000,000 | 5,000–80,000 | 2,500–200,000 | 5,500–12,000 |
| Melting Point, °F. | 635–650 | 500–530 | 575–590 | 490–535 |
| Continuous Service Temp., °F. | 500 | 400 | 500 | 302 |
| Specific Gravity | 2.13–2.24 | 2.15 | 2.15 | 1.70 |

According to the invention, aluminum is preferably first cleaned, then conversion coated with a chromate conversion coating, then preferably rinsed and dried. Preferably the chromate conversion coating meets the specifications set forth in United States military specification MIL-C-5541D, Feb. 8, 1989, which is incorporated herein.

The aluminum is cleaned at room temperature with an alkaline cleaner which cleaners are commercially available under the trademark Ridoline and Ridosol from Parker Amchem, Madison Heights, Mich. After cleaning the aluminum is rinsed with water at room temperature. Thereafter the conversion coating is applied at room temperature with an aqueous coating composition. The conversion coating composition includes hexavalent chromium. Chromic acid ($CrO_3$) or chromium salts such as sodium or potassium chromate or dichromate are typical sources of hexavalent chromium. Generally, the aqueous coating compositions contain one or more of the following: fluoride ions, phosphate ions, cyanide ions, molybdenum ions, nitrate ions, sulfate ions and halogen ions other than fluoride ions. An important aspect of this invention is that the conversion coating composition includes a fluorine bearing compound containing either a simple or complex salt and also may contain a cyanide such as ferro and ferricyanides. These coating compositions are generally described in U.S. Pat. No. 2,988,465 to Newhard et al. and are commercially available under the name Alodine 1200 from Parker Amchem which product includes about 20 to about 50 weight percent chromic acid, about 5 to about 15 weight percent potassium fluozirconate, from about 30 to about 60 weight percent sodium fluoborate and from about 10 to about 30 weight percent potassium ferricyanide. From about 1 to about 2 oz. of Aldine 1200 in one gallon of water is used to conversion coat the aluminum for about 1 to about 5 minutes at room temperature.

After conversion coating the aluminum, the conversion coated surface is rinsed with running water at room temperature for about ½ to about one minute. Thereafter the conversion coated surface is rinsed with an acidulated rinse, which includes from about ½ to about 1 weight percent chromic acid in water, or alternatively, about 0.01 to about 0.05 oz. of Alodine per gallon of water, for about ½ minute at about 140° to about 150° F. The aluminum may be coated and rinsed by immersion, spray or brushing as is known.

After rinsing the conversion coated aluminum is dried at a temperature of at least about 70° F., but not more than 150° F. for about 10 minutes. It is important that drying be finished while the conversion coating is soft or gel-like. While not intending to be bound by any theory, it is believed that contacting the conversion coated aluminum with the fluoropolymer while the conversion coating is a gel or gel-like enhances the bonding strength of the aluminum fluoropolymer laminate.

After drying the fluoropolymer is superposed onto the surface of the conversion coating and held there under a pressure sufficient to keep the polymer conversion coating surfaces in intimate contact during subsequent heating to a temperature of at least about 550° F. to about 850° F. The temperature at which the fluoropolymer and the conversion coated aluminum are heated to bond the aluminum and fluoropolymer is a function of the type fluoropolymer used as well as the thicknesses of the aluminum and fluoropolymer. The pressure used may be only the pressure to keep the fluoropolymer structure in intimate contact with the conversion coated aluminum such as about 10 psi to about 20 psi.

The invention permits the bonding of an existing fluoropolymer structure having dimensions such as a thickness to an existing aluminum structure. Hence bonding conversion coated aluminum with thickness in the range of from about 0.5 to about 1,000 mils to a fluoropolymer structure with a thickness in the range of from about 0.5 to about 1,000 mils is effected according to the invention. Moreover, a particularly important aspect of this invention is that conversion coated aluminum is bonded with a fluoropolymer structure which is thicker than the aluminum.

In another particularly important aspect of the invention, fluoropolymer film is bonded with an aluminum foil. For fluoropolymer thicknesses in the range of from about 1 to about 125 mils and preferably from about 1 to about 10 mils and aluminum thicknesses of from about 1 to about 125 mils and preferably from about 1 to about 10 mils, a polytetrafluoroethylene/conversion coated aluminum combination preferably should be heated to about 700° F. to about 750° F. for at least about one minute to provide a fluoropolymer/aluminum bond strength of from about 6 to about 8 pounds/inch of width of laminate. The ratio of the thickness of the film to aluminum should be in the range of from about 0.01 to about 100. In this aspect of the invention, the aluminum foil and polymer film in superposed overlying relation are rolled onto a spindle to produce intimate contact and pressure between the foil and film such that when the rolled laminate is heated the conversion coated aluminum and film will bond.

For the same thickness ranges of polymer and aluminum as described with polytetrafluoroethylene and aluminum, a fluoroethylene copolymer/conversion coated aluminum combination preferably should be heated to about 600° F. to about 650° F. for at least about one minute to provide a fluoropolymer aluminum bond strength of from about 15 to about 19 pounds/inch of width of laminate.

At the same thickness ranges of polymer and aluminum as described with polytetrafluoroethylene and aluminum, an alkoxy fluoroethylene copolymer/conversion coated aluminum combination should be heated to about 650° F. to from about 700° F. for at least about one minute to provide a fluoropolymer/aluminum bond strength of from about 19 to about 21 pounds/inch of width of laminate.

When ethylene tetrafluoroethylene copolymer and aluminum are used at the thickness ranges of from about 1 to about 50 mils of polymer and from about 1 to about 125 mils for aluminum, the conversion coated aluminum and polymer should be held together and heated to from about 550° F. to about 600° F. for at least about one minute to provide a fluoropolymer/aluminum bond strength of from about 19 to about 21 pounds/inch of width of laminate.

A second fluoropolymer may be bonded to the fluoropolymer bonded onto the conversion coated aluminum. In this aspect of the invention the two polymers are held such that each surface is held into superposed intimate contact and heated to a temperature which is above the melt or gel point of the most thermally stable polymer. The two polymers bond to provide a three layered laminate. Additional polymers including fluoropolymers may be layered and bonded into a multiple layered structure.

The following examples set forth exemplary ways of practicing the invention.

EXAMPLE I

A 5 mil thick aluminum strip was cleaned in Ridolene, an alkaline cleaner, at room temperature for 15 seconds and then rinsed in room temperature water. The cleaned aluminum was then dipped in a chromate conversion coating, 1 oz. of Alodine 1200 in 1 gallon of water, for 1 minute at room temperature and then rinsed in room temperature water. The conversion coated strip was dried at room temperature for 30 minutes.

The conversion coated aluminum was then cut to a 1 inch width and wrapped around a 1 inch long tube of alkoxy fluoroethylene copolymer with an outer diameter of 0.300 inches and a wall thickness of 0.030 inches. The strip was wound leaving a 1 inch overlap. The wrapped combination was then wrapped in another aluminum strip to maintain intimate contact between the fluoropolymer and the conversion coated aluminum. This combination was then heated to 750° F. and held stable at that temperature for one minute. The outermost layer of aluminum (which is not part of the structure) was removed to expose the fluoropolymer/conversion coated aluminum laminate. A mandral was placed through the inside of the tube and fitted into one jaw of a tensile tester, while the 1 inch overlap was clamped in the other jaw. The laminate was then subjected to tensile load at a strain rate of about 0.5 inches per minute and began to peel at a tensile load of 21 pounds.

EXAMPLE II

Using the 5 mil aluminum which was conversion coated as described in Example I, a laminate was constructed as in Example I, except that the tube was polytetrafluoroethylene and a 0.002 inch thick film of alkoxy fluoroethylene copolymer was wrapped around the tube before the conversion coated aluminum. The combination was thermally processed and peel tested as in Example I and exhibited a peel strength of 21 pounds.

EXAMPLE III

A laminate was constructed as in Example II, but was 12 inches long. After thermal processing as in Example I, the resultant tubular laminate could be bent to a desired radius and would stay in place.

EXAMPLE IV

Using the 5 mil aluminum which was conversion coated as described in Example I, a laminate was constructed of a layer of 0.002 inch thick alkoxy fluoroethylene copolymer between two layers of the 5 mil thick conversion coated aluminum strip. The combination was held in intimate contact and thermally processed as in Example I. The resultant conversion coated aluminum/fluoropolymer/conversion coated aluminum laminate was peel tested and found to have a peel strength of 19 pounds per inch of width. The resulting laminate included two pieces of aluminum held together with a fluoropolymer film.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is

1. A method for bonding aluminum to a preexisting fluoropolymer structure, the method comprising:
    applying a chromate conversion coating composition to an aluminum surface to provide a conversion coating on the aluminum;
    superposing the fluoropolymer structure onto the conversion coated aluminum to contact the fluoropolymer with the conversion coating on the aluminum surface to provide a superposed conversion coated aluminum fluoropolymer laminate, the conversion coating on the aluminum having a consistency of a gel and including fluoride ions; and
    heating the superposed fluoropolymer-conversion coated aluminum laminate to at least about 700° F. for a time and at a pressure to effectively bond the conversion coated aluminum to the preexisting fluoropolymer structure to provide a fluoropolymer aluminum laminate.

2. A method as recited in claim 1, the method further comprising drying the conversion coating for at least about 10 minutes at least about 70° F.

3. A method as recited in claims 1 or 2, the method further comprising cleaning the surface of the aluminum prior to applying the chromate conversion coating thereon.

4. A method as recited in claim 1 wherein the ratio of the thickness of the fluoropolymer structure to aluminum is in the range of from about 0.01 to about 100.

5. A method as recited in claim 4 wherein the fluoropolymer structure is thicker than the conversion coated aluminum.

6. A method as recited in claims 1, 2, 4 or 5 wherein the fluoropolymer structure comprises polytetrafluoroethylene.

7. A method as recited in claims 1, 2, 4 or 5 wherein the fluoropolymer structure comprises a fluoroethylene copolymer.

8. A method as recited in claims 1, 2, 4 or 5 wherein the fluoropolymer structure comprises an alkoxy fluoroethylene copolymer.

9. A method as recited in claims 1, 2, 4 or 5 wherein the fluoropolymer structure comprises an ethylene tetrafluoroethylene copolymer.

10. A method as recited in claims 1, 2, 4 or 5 wherein the fluoropolymer structure comprises polytetrafluoroethylene and the superposed fluoropolymer-conversion coated aluminum laminate is heated to at least about 700° F. for at least one minute to provide a fluoropolymer/aluminum bond strength of from about 6 to about 8 pounds/inch of width of laminate.

11. A method for bonding a fluoropolymer structure to aluminum, the method comprising:
    applying a chromate conversion coating to aluminum to provide a conversion coated aluminum surface, the chromate conversion coating provided by a coating composition which comprises hexavalent chromium and a compound which includes fluorine, the conversion coating have a consistency of a gel;
    contacting a surface of the fluoropolymer structure with the conversion coated aluminum surface to provide a superposed fluoropolymer-conversion coated aluminum laminate, the fluoropolymer structure and conversion coated aluminum having thicknesses wherein the ratio of the thickness of the fluoropolymer structure to the conversion coated aluminum is in the range of from about 0.05 to about 20; and
    heating the superposed conversion coated fluoropolymer laminate to at least about 700° F. for at least one minute to provide a fluoropolymer-aluminum laminate with a fluoropolymer/aluminum bond strength of at least about 8 pounds/inch of laminate.

12. A method as recited in claim 11 wherein the fluoropolymer structure is thicker than the conversion coated aluminum.

13. A method as recited in claim 11, the method further comprising drying the conversion coating for at least about 10 minutes at least about 70° F.

14. A method as recited in claims 11, 12 or 13 wherein the fluoropolymer structure comprises a fluoropolymer selected from the group consisting of polytetrafluoroethylene, a fluoroethylene copolymer, an alkoxy fluoroethylene copolymer and an ethylene tetrafluoroethylene copolymer.

15. A method of bonding an aluminum foil to a fluoropolymer film, the foil having a thickness in the range of from about 1 mil to about 125 mils, the fluoropolymer film having the thickness in the range of from about 1 mil to about 125 mils, the method comprising:
    applying a chromate conversion coating to at least one surface of the aluminum foil with a conversion coating composition to provide a conversion coated aluminum foil, the conversion coating on the aluminum having a consistency of a gel and including fluoride ions;
    superposing the fluoropolymer film onto the conversion coated aluminum foil to contact the fluoropolymer with the conversion coating on the aluminum foil to provide a superposed conversion coated aluminum foil fluoropolymer laminate; and heating the superposed conversion coated aluminum foil fluoropolymer laminate to at least about 700° F. for a time and at a pressure to effectively bond the fluoropolymer to the conversion coated aluminum foil to provide an aluminum foil fluoropolymer laminate.

16. A method as recited in claim 15 wherein the ratio of the thickness of the fluoropolymer to the thickness of aluminum foil is in the range of from about 0.01 to about 100 and the conversion coating composition comprising hexavalent chromium and a compound which includes fluorine.

17. A method as recited in claims 15 or 16 wherein the fluoropolymer is polytetrafluoroethylene and the superposed conversion coated aluminum foil fluoropolymer laminate is heated to at least about 700° F. for at least one minute to provide a fluoropolymer/aluminum bond strength of from about 6 to about 8 pounds/inch of width of laminate.

18. A method for bonding aluminum together, the method comprising:

applying a chromate conversion coating to at least two aluminum surfaces, with a conversion coating composition, to provide conversion coated aluminum surfaces, said conversion coated surfaces having a consistency of a gel;

superposing a fluoropolymer film having a thickness in the range of from about 1 to 10 mils between the conversion coated aluminum surfaces such that the fluoropolymer film is in about contact with both conversion coated aluminum surfaces to provide a superposed conversion coated aluminum/fluoropolymer aluminum laminate, the conversion coating including fluoride ion; and heating the superposed conversion coated aluminum/fluoropolymer laminate to at least about 700° F. for a time sufficient to effectively bond the conversion coated aluminum surfaces to the fluoropolymer to provide a laminate having at least two aluminum surfaces bonded with the fluoropolymer film.

* * * * *

UNITED STATES PATENT AND TRADEMARK OFFICE
CERTIFICATE OF CORRECTION

PATENT NO. : 5,401,334
DATED : March 28, 1995
INVENTOR(S) : O'Melia et al.

It is certified that error appears in the above-identified patent and that said Letters Patent is hereby corrected as shown below:

IN THE CLAIMS:

Claim 13, column 8, line 3, "at least about 70° F." should read --at at least about 70° F.--

Signed and Sealed this

Eighth Day of August, 1995

Attest:

BRUCE LEHMAN

Attesting Officer

Commissioner of Patents and Trademarks